(12) United States Patent
Lee et al.

(10) Patent No.: US 11,465,624 B2
(45) Date of Patent: Oct. 11, 2022

(54) METHOD OF COOPERATIVELY CONTROLLING REGENERATIVE BRAKING STEP BY STEP FOR REAR-WHEEL-DRIVE ENVIRONMENTALLY-FRIENDLY VEHICLE

(71) Applicants: Hyundai Motor Company, Seoul (KR); Kia Motors Corporation, Seoul (KR)

(72) Inventors: Joung-Hee Lee, Gyeonggi-do (KR); Ung-Hee Shin, Jeollanam-do (KR); Gab-Bae Jeon, Gyeonggi-do (KR); Jae-Hun Shim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 199 days.

(21) Appl. No.: 16/693,243

(22) Filed: Nov. 23, 2019

(65) Prior Publication Data

US 2020/0353930 A1 Nov. 12, 2020

(30) Foreign Application Priority Data

May 8, 2019 (KR) .......................... 10-2019-0053856

(51) Int. Cl.
*B60W 30/18* (2012.01)
*B60L 7/18* (2006.01)
(Continued)

(52) U.S. Cl.
CPC ......... *B60W 30/18127* (2013.01); *B60L 7/18* (2013.01); *B60W 30/09* (2013.01);
(Continued)

(58) Field of Classification Search
CPC ....... B60W 30/18127; B60W 30/0956; B60W 30/0953; B60W 30/09; B60W 2720/403;
(Continued)

(56) References Cited

U.S. PATENT DOCUMENTS 9,707,944 B2 * 7/2017 Doi ........................ B60T 8/1766
2005/0099146 A1 * 5/2005 Nishikawa ............... B60K 6/52
318/63

(Continued)

FOREIGN PATENT DOCUMENTS

EP       3127738 A1 *  2/2017   ................ B60L 7/26
JP       05-161213 A    6/1993
(Continued)

*Primary Examiner* — Abby Y Lin
*Assistant Examiner* — Dylan M Katz
(74) *Attorney, Agent, or Firm* — Fox Rothschild LLP

(57) ABSTRACT

A method of cooperatively controlling regenerative braking step by step for a vehicle, such as a rear-wheel-drive environmentally-friendly vehicle, performs a braking mode in accordance with a traveling risk degree determined in advance before initiating braking and changes the selectively performed braking mode by re-determining the traveling risk degree during a braking operation. The method includes: a first step of determining in advance the traveling risk degree before initiating braking; a second step of selectively performing any one of braking modes defined based on the traveling risk degree during braking; a third step of re-determining the traveling risk degree after the second step; and a fourth step of changing the selectively performed braking mode based on the traveling risk degree determined in the third step.

9 Claims, 10 Drawing Sheets

(51) Int. Cl.
*B60W 30/095* (2012.01)
*B60W 30/09* (2012.01)
*B60W 20/14* (2016.01)
*B60T 8/26* (2006.01)

(52) U.S. Cl.
CPC .... *B60W 30/0953* (2013.01); *B60W 30/0956* (2013.01); *B60T 8/26* (2013.01); *B60W 20/14* (2016.01)

(58) Field of Classification Search
CPC ........... B60W 30/18172; B60W 10/08; B60W 10/188; B60L 7/18; B60L 7/10; B60L 7/26; B60T 8/26; B60T 1/10; B60T 2270/60; B60T 2270/608; B60Y 2200/92; B60Y 2200/91; Y02T 90/40
See application file for complete search history.

(56) References Cited

U.S. PATENT DOCUMENTS

| | | | |
|---|---|---|---|
| 2016/0347181 A1* | 12/2016 | Yamakado | B60L 15/2009 |
| 2017/0096070 A1* | 4/2017 | Hyun | B60L 7/26 |
| 2018/0086209 A1* | 3/2018 | Jeon | B60L 3/108 |

FOREIGN PATENT DOCUMENTS

| | | |
|---|---|---|
| JP | 2003-237556 A | 8/2003 |
| JP | 2003-306138 A | 10/2003 |
| JP | 2007-209183 A | 8/2007 |
| KR | 10-2007-0062230 A | 6/2007 |
| KR | 10-2016-0071850 A | 6/2016 |
| KR | 10-2017-0029344 A | 3/2017 |
| KR | 10-1816479 B1 | 1/2018 |
| KR | 10-2018-0058322 A | 6/2018 |
| KR | 10-1905976 B1 | 10/2018 |

\* cited by examiner

METHOD OF COOPERATIVELY CONTROLLING REGENERATIVE BRAKING STEP BY STEP FOR REAR-WHEEL-DRIVE ENVIRONMENTALLY-FRIENDLY VEHICLE

CROSS-REFERENCE TO RELATED APPLICATION(S)

This application claims under 35 U.S.C. § 119 the benefit of Korean Patent Application No. 10-2019-0053856, filed on May 8, 2019 in the Korean Intellectual Property Office, the entire contents of which are incorporated herein by reference.

BACKGROUND

1. Technical Field

The present disclosure relates to a method of cooperatively controlling regenerative braking step by step for a vehicle (e.g., a rear-wheel-drive environmentally-friendly vehicle), more particularly, to the method that performs a braking mode in accordance with a traveling risk degree determined in advance before initiating braking and changes the currently performed braking mode by re-determining the traveling risk degree during a braking operation.

2. Description of the Related Art

In general, cooperative regenerative braking control, which performs regenerative braking on rear wheels of environmentally-friendly vehicles (e.g., hybrid vehicles, electric vehicles, fuel cell vehicles, etc.), is different from the control in the related art which performs regenerative braking only on front wheels of the vehicles.

In an environmentally-friendly vehicle in which the regenerative braking is performed only on a front wheel, a drive motor is disposed on the front wheel. Regenerative braking force is generated when the drive motor recovers energy by charging a battery, and the braking force is applied only to the front wheel.

With the regenerative braking force applied to the front wheel, a likelihood that the vehicle spins decreases even though overall braking force applied to the front wheel is high, and thus it is possible to maximize the amount of generated regenerative braking force in order to recover a large amount of energy.

However, in the case of the environmentally-friendly vehicle in which the regenerative braking is performed on the rear wheel, there is a limitation in increasing regenerative braking force because the rear wheel is locked first when increasing the regenerative braking force applied to the rear wheel in order to recover a large amount of energy, which increases a likelihood that the vehicle spins. In a case in which regenerative braking force is generated when an accelerator pedal and a brake pedal are turned off, three types of braking force including regenerative coasting braking force controlled by a drive controller, rear wheel regenerative braking force controlled by a braking controller, and frictional braking force generated by hydraulic pressure are simultaneously applied in the vehicle. In this case, if the braking controller distributes braking force to the front wheel and the rear wheel without considering the regenerative coasting braking force, the rear wheel braking force is excessively increased in comparison with the front wheel braking force, which causes a problem that increases a likelihood that the rear wheel is locked prior to the front wheel.

Meanwhile, referring to FIG. 11A (RELATED ART), the rear wheel regenerative braking force may be set to be low in a low-deceleration section (A section) in order to ensure stability of the vehicle, but an effect of improving fuel economy, which is obtained by the rear wheel, is decreased. In addition, referring to FIG. 11B (RELATED ART), the rear wheel regenerative braking force may be set to be high in the low-deceleration section (A section) in order to improve fuel economy, but there is a limitation in generating only the rear wheel regenerative braking force to prevent the rear wheel from being locked first.

To address these problems, Korean Patent No. 10-1905976 (Method of Controlling Braking Force when Cooperatively Controlling Regenerative Braking) in the related art discloses that only rear wheel regenerative braking force is generated by considering regenerative coasting braking force in a low-deceleration section.

However, in Korean Patent No. 10-1905976, because regenerative braking force applied to a front wheel is considered, there are problems in that it is difficult to distribute braking force in a rear-wheel-drive environmentally-friendly vehicle, and braking force is distributed while ignoring a traveling situation before initiating braking.

SUMMARY

The present disclosure is arranged to cooperatively control regenerative braking in order to distribute braking force to a front wheel and a rear wheel of a vehicle (e.g., a rear-wheel-drive environmentally-friendly vehicle), distribute braking force for each braking mode by recognizing in advance a traveling situation before initiating braking, and change a braking mode for each step during braking.

An exemplary embodiment of the present disclosure provides a method of cooperatively controlling regenerative braking step by step for a vehicle, which distributes braking force to a front wheel and a rear wheel differently based on a traveling risk degree in consideration of regenerative coasting braking force and rear wheel regenerative braking force generated to the rear wheel, the method including: a first step of determining in advance the traveling risk degree before initiating braking; a second step of selectively performing any one of braking modes defined based on the traveling risk degree during braking; a third step of re-determining the traveling risk degree after the second step; and a fourth step of changing the selectively (currently) performed braking mode based on the traveling risk degree determined in the third step.

According to the present disclosure, information about coasting regeneration amounts, which are changed in real time, is received in the environmentally-friendly vehicle in which the regenerative braking is performed on the rear wheel, and as a result, it is possible to actively distribute braking force to the front wheel and the rear wheel.

According to the present disclosure, it is possible to actively and cooperatively control the regenerative braking by determining in advance a traveling risk degree before initiating braking, and then activating a fuel economy improving mode or a stable mode during braking.

According to the present disclosure, it is possible to change the braking mode by re-determining the traveling risk degree even during braking.

Another exemplary embodiment of the present disclosure provides a non-transitory computer readable medium containing program instructions executed by a processor, including: program instructions that determine in advance a traveling risk degree before initiating braking; program instructions that selectively perform any one of braking modes defined based on the traveling risk degree during braking; program instructions that re-determine the traveling risk degree after selectively performing the one of the braking modes; and program instructions that change the selectively performed braking mode based on the re-determined traveling risk degree.

DETAILED DESCRIPTION OF THE EMBODIMENTS

Figure 1:
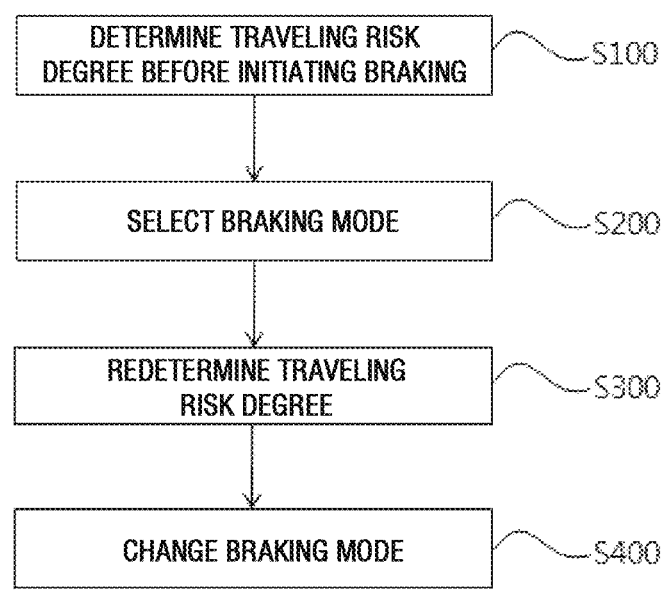
FIG. 1 is a view illustrating a method of cooperatively controlling regenerative braking step by step for a rear-wheel-drive environmentally-friendly vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or" and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of a method of cooperatively controlling regenerative braking step by step for a rear-wheel-drive environmentally-friendly vehicle according to the present disclosure will be described in detail with reference to the drawings. Terms or words used herein should not be interpreted as being limited to a general or dictionary meaning and should be interpreted as a meaning and a concept which conform to the technical spirit of the present disclosure based on a principle that an inventor can appropriately define a concept of a term in order to describe his/her own disclosure by the best method.

A method of cooperatively controlling regenerative braking step by step for a vehicle (e.g., a rear-wheel-drive environmentally-friendly vehicle) according to the present disclosure is a new type of method of cooperatively controlling regenerative braking, which is capable of improving braking stability and performance, and fuel economy in environmentally-friendly vehicles (e.g., hybrid vehicles, electric vehicles, fuel cell vehicles, etc.) in which regenerative braking is performed on rear wheels.

The method of cooperatively controlling regenerative braking step by step for a rear-wheel-drive environmentally-friendly vehicle according to the present disclosure is a braking force controlling method which considers overall braking force of a vehicle including braking force generated by regenerative braking generated when the vehicle coasts, that is, regenerative braking force generated in a non-acceleration and non-braking situation, depending on a braking system capable of independently controlling braking force to the front wheel and the rear wheel in the environmentally-friendly vehicle in which regenerative braking is performed on the rear wheel. The method according to the present disclosure ensures braking stability and improves fuel economy by maximizing a recovery of energy generated by regenerative braking.

As is well known, the braking system for implementing the method of cooperatively controlling regenerative braking step by step for a rear-wheel-drive environmentally-friendly vehicle according to the present disclosure is a system that may independently control frictional braking force to the front wheel and the rear wheel, cooperatively control the regenerative braking force and the frictional braking force, and allow the manipulation of a brake pedal and the generation of braking force to be independently performed. The braking system includes a brake controller for controlling the frictional braking force and the regenerative braking force.

The braking system is configured to acquire information about an amount of generated regenerative coasting braking force. For example, the braking system may include the braking controller that stores the information about the predetermined amount of generated regenerative coasting braking force or may additionally receive information about the amount of generated regenerative coasting braking force from a drive controller.

The method of cooperatively controlling regenerative braking step by step for a rear-wheel-drive environmentally-friendly vehicle according to the present disclosure is a method of distributing, for each braking mode, with the braking system, the frictional braking force to the front wheel and the rear wheel and the regenerative braking force to the rear wheel generated by considering the regenerative coasting braking force.

FIG. 1 is a view illustrating a method of cooperatively controlling regenerative braking step by step for a rear-wheel-drive environmentally-friendly vehicle according to an exemplary embodiment of the present disclosure.

The method of cooperatively controlling regenerative braking step by step for a rear-wheel-drive environmentally-friendly vehicle according to the exemplary embodiment of the present disclosure includes a first step S100 of determining in advance a traveling risk degree before initiating braking, a second step S200 of selectively performing braking for each braking mode defined based on the traveling risk degree during braking, a third step of re-determining the traveling risk degree after the second step, and a fourth step of changing the selectively (currently) performed braking mode based on the traveling risk degree determined in the third step.

The first step S100 is a step of determining in advance the traveling risk degree of the vehicle in a situation before initiating braking. The situation before initiating braking may mean a case in which a driver manipulates neither an accelerator pedal nor a brake pedal while the vehicle travels. In this case, the regenerative braking force is generated to the rear wheel as the vehicle coasts.

The method of determining the traveling risk degree may consider any one or two or more pieces of information among information about a traveling state of the vehicle, information about a condition in which the driver accelerates the vehicle, information about a state of a road surface, and information about an amount of regenerative braking enabled by the driver controller.

The information about a traveling state of the vehicle, the information about a condition in which the driver accelerates the vehicle, the information about a state of a road surface, and the information about the amount of regenerative braking enabled by the driver controller may be determined based on a speed of the vehicle, acceleration of the vehicle, a slip rate of the wheel, a difference in wheel speed between the front wheel and the rear wheel, a steering amount, a yaw rate, a degree of friction of a road surface, or a degree of inclination of a road surface.

To determine the above information, the vehicle may be provided with wheel speed sensors provided for the front wheel and the rear wheel, respectively, a yaw rate sensor configured to detect a yaw rate of the vehicle, a steering angle sensor configured to detect a steering angle of a steering wheel, a camera configured to detect visual information about a state of a road surface. These sensors may be electrically connected to the braking controller. However, the method of determining the traveling risk degree according to the exemplary embodiment of the present disclosure is not limited the above-mentioned method, and various publicly known methods may be used.

The traveling risk degree may be divided into various states based on a degree of risk in consideration of the above-mentioned information. For example, based on a magnitude of a slip rate of the wheel, the traveling risk degree may be divided into a stable state in which the vehicle is not risky, a low-risk state in which the vehicle is somewhat risky, and a high-risk state in which the vehicle is riskier than in the low-risk state. The respective states may be divided based on a magnitude of deceleration. In the present disclosure, a first limit value corresponding to a magnitude of deceleration defining a boundary between the stable state and the low-risk state, a second limit value corresponding to a magnitude of deceleration defining a boundary between the low-risk state and the high-risk state, and a third limit value corresponding to a magnitude of deceleration defining a boundary between the high-risk state and a higher-risk state may be set in advance. Here, the first to third limit values may be specific values or ranges calculated based on the traveling risk degree, and the first to third limit values may be set to various values or various ranges.

Because the first step S100 is automatically performed by the braking controller based on the aforementioned information before initiating braking, that is, before the driver pushes the brake pedal, the driver need not separately input the information to determine the traveling risk degree.

According to the exemplary embodiment of the present disclosure, the braking modes are distinguished based on the traveling risk degree. Therefore, the second step S200 is performed by selecting, among the braking modes, the braking mode that matches with the traveling risk degree determined in the first step S100.

The braking modes include first to fourth modes. The braking modes may be expressed in a braking diagram illustrating a distribution of braking force to the front wheel and the rear wheel.

Figure 2:
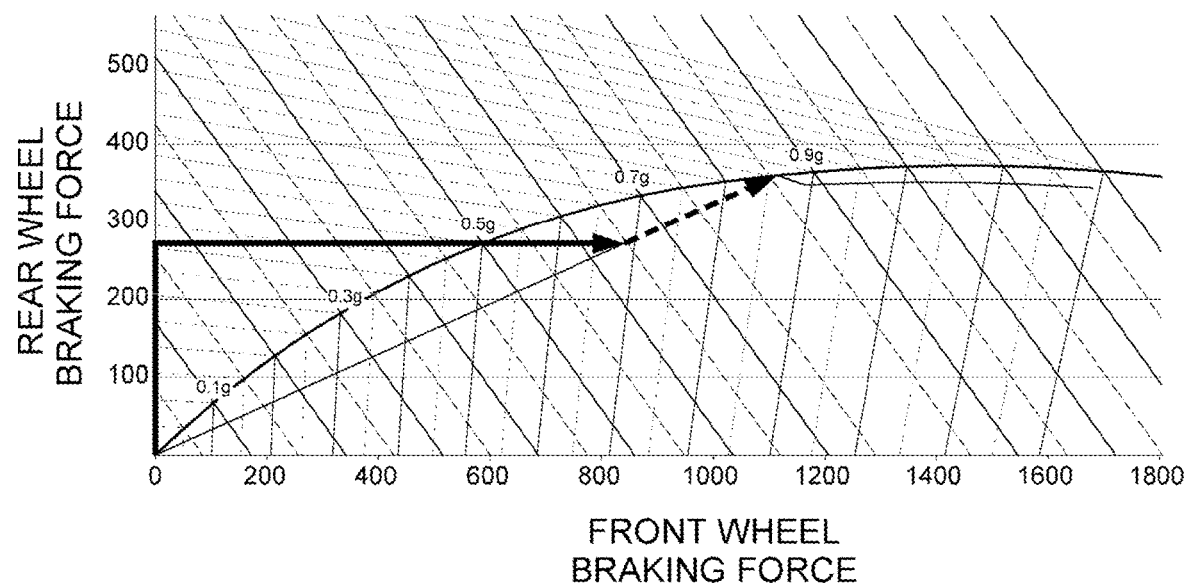
FIG. 2 is a braking diagram illustrating a distribution of front wheel braking force and rear wheel braking force in a first mode according to the exemplary embodiment of the present disclosure.
Figure 3:
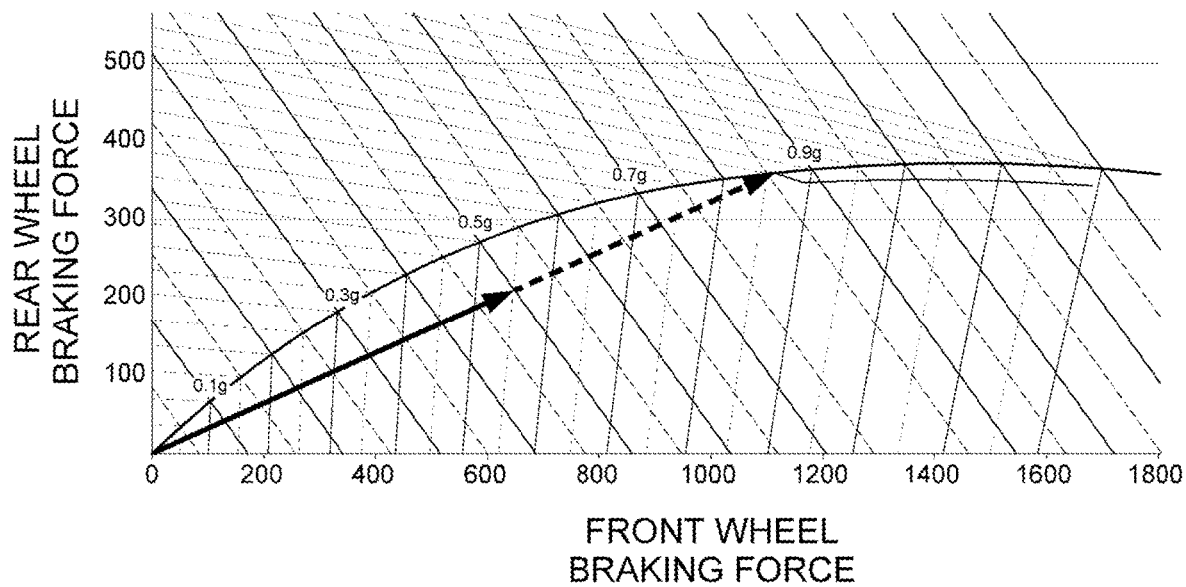
FIG. 3 is a braking diagram illustrating a distribution of front wheel braking force and rear wheel braking force in a second mode according to the exemplary embodiment of the present disclosure.
Figure 4:
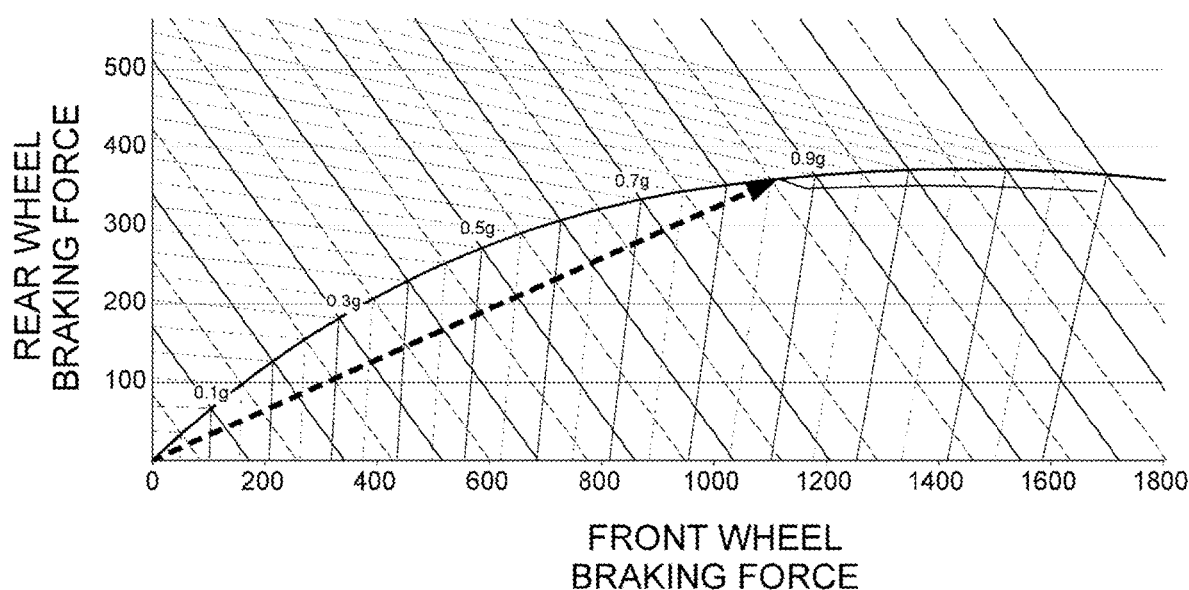
FIG. 4 is a braking diagram illustrating a distribution of front wheel braking force and rear wheel braking force in a third mode according to the exemplary embodiment of the present disclosure.
Figure 5:
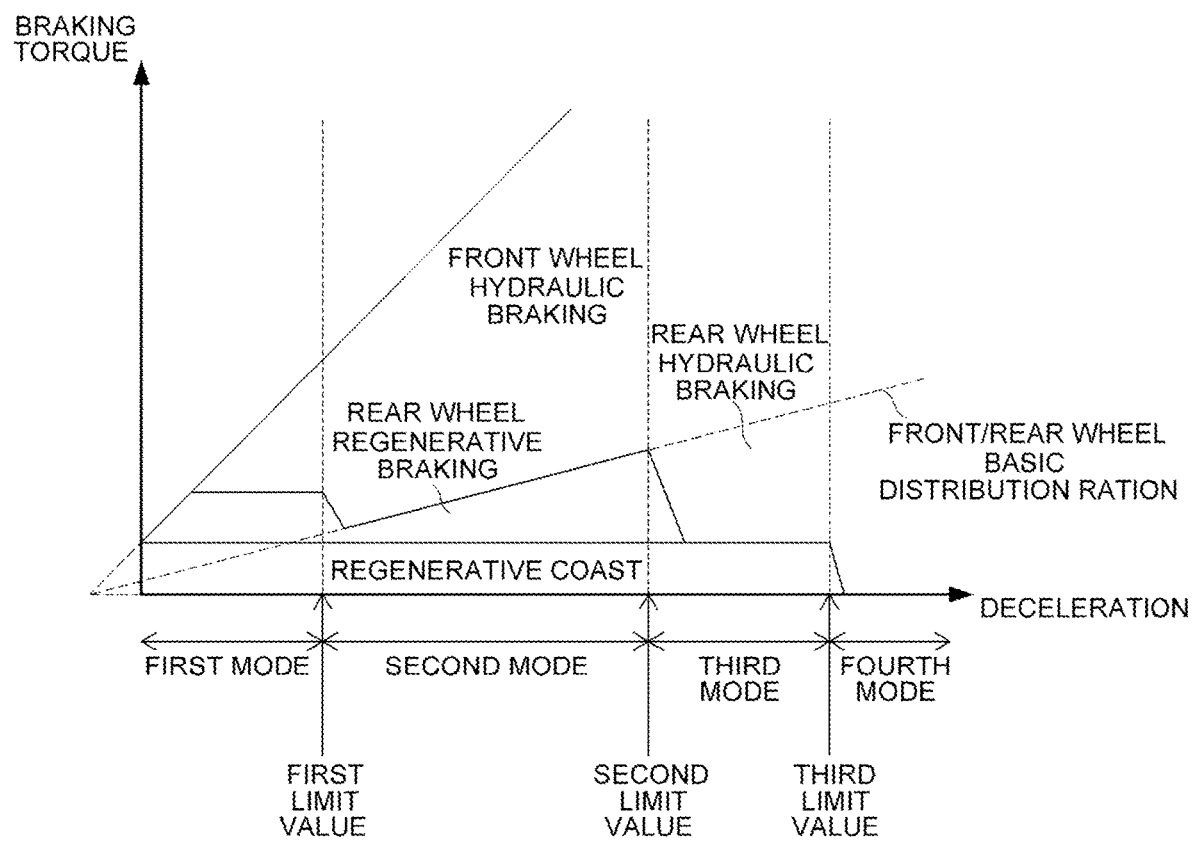
FIG. 5 is a braking diagram illustrating a distribution of braking force which is differently applied based on a magnitude of deceleration in the first to fourth modes according to the exemplary embodiment of the present disclosure.

FIG. 2 is a braking diagram illustrating a distribution of front wheel braking force and rear wheel braking force in the first mode according to the exemplary embodiment of the present disclosure, FIG. 3 is a braking diagram illustrating a distribution of front wheel braking force and rear wheel braking force in the second mode according to the exemplary embodiment of the present disclosure, FIG. 4 is a braking diagram illustrating a distribution of front wheel braking force and rear wheel braking force in the third mode according to the exemplary embodiment of the present disclosure, and FIG. 5 is a braking diagram illustrating a distribution of braking force which is differently applied based on a magnitude of deceleration in the first to fourth modes according to the exemplary embodiment of the present disclosure.

The braking diagrams illustrated in FIGS. 2 to 4 show distributions of the front wheel braking force (X axis) and the rear wheel braking force (Y axis), and the oblique lines illustrated in the braking diagrams indicate magnitudes of uniform deceleration (increased toward the right side), the solid arrows indicate actual braking distribution ratios during rear wheel regenerative braking, the dotted arrows indicate rear-wheel-first-locking preventing distribution ratios, and the curved lines indicate ideal braking distribution ratios.

Referring to FIG. 2, in the first mode, regenerative braking force is generated only to the rear wheel so as to be increased to a predetermined deceleration, but no braking force is generated to the front wheel. In the present disclosure, a magnitude of deceleration at which the rear wheel regenerative braking force does not increase any further during the first mode is defined as a maximum rear wheel regenerative braking force. That is, no braking force is distributed to the front wheel until the maximum rear wheel regenerative braking force is generated.

After the rear wheel regenerative braking force reaches the maximum rear wheel regenerative braking force, the braking force is distributed to the front wheel and the rear wheel at the rear-wheel-first-locking preventing distribution ratio while maintaining the maximum rear wheel regenerative braking force even though a magnitude of deceleration increases. However, a value of the maximum rear wheel regenerative braking force, which has been constantly maintained, is not maintained any more when the magnitude of deceleration reaches the first limit value.

Meanwhile, the rear-wheel-first-locking preventing distribution ratio is a ratio for distributing the braking force to the front wheel and the rear wheel within a limit in which no over braking occurs on the rear wheel. A gradient of a rear-wheel-first-locking preventing distribution line may be appropriately set for each vehicle in consideration of design elements of brake units within a range larger or smaller than a gradient of a front/rear wheel basic distribution ratio determined based on brake specifications. The drawings according to the exemplary embodiment of the present disclosure illustrate that the rear-wheel-first-locking preventing distribution ratio is equal to the front/rear wheel basic distribution ratio.

The first mode is the braking mode in which the vehicle is determined as being in the stable state in the first step S100, and as illustrated in FIG. 2, the first mode preferentially performs the regenerative braking on the rear wheel, thereby more preferentially considering the improvement in fuel economy than the braking stability.

Referring to FIG. 3, in the second mode, the rear wheel regenerative braking force is considered, and the braking force is distributed to the front wheel and the rear wheel at the rear-wheel-first-locking preventing distribution ratio. A section of a magnitude of deceleration in the second mode is from the first limit value to the second limit value.

The second mode is the braking mode in which the vehicle is determined as being in the low-risk state in the first step S100, and as illustrated in FIG. 3, the braking force is distributed to the front wheel and the rear wheel simultaneously with considering the regenerative braking to the rear wheel, thereby considering both of the fuel economy and the braking stability.

Referring to FIG. 4, in the third mode, no rear wheel regenerative braking force is generated, and the braking force is distributed to the front wheel and the rear wheel at the rear-wheel-first-locking preventing distribution ratio. A section of a magnitude of deceleration in the third mode is from the second limit value to the third limit value.

The third mode is the braking mode in which the vehicle is determined as being in the high-risk state in the first step S100, and as illustrated in FIG. 4, the braking force is distributed to the front wheel and the rear wheel without considering the regenerative braking to the rear wheel, thereby more preferentially considering the braking stability than the improvement in fuel economy.

Meanwhile, the regenerative coasting braking force is generated during the first to third modes, and the amount of generated regenerative coasting braking force is included in the braking force to be distributed in the first to third modes.

Although not illustrated in the drawings, in the fourth mode, the regenerative coasting braking force applied to the rear wheel is released, and the braking force is distributed to the front wheel and the rear wheel at the rear-wheel-first-locking preventing distribution ratio. A section of a magnitude of deceleration in the fourth mode is larger than the third limit value.

The fourth mode is the braking mode in which the vehicle is determined, in the first step S100, as being in a state riskier than the state in the third mode, the braking force is distributed to the front wheel and the rear wheel with overall regenerative braking force released, thereby considering the braking stability.

Referring to FIG. 5, the single braking diagram illustrates the first to fourth modes defined based on a magnitude of deceleration. As illustrated in FIG. 5, the first to fourth modes are defined based on a magnitude of deceleration. For example, the braking mode in a section of deceleration smaller than the first limit value is the first mode, and the braking mode in a section of deceleration larger than the first limit value and smaller than the second limit value is the second mode.

Figure 6:
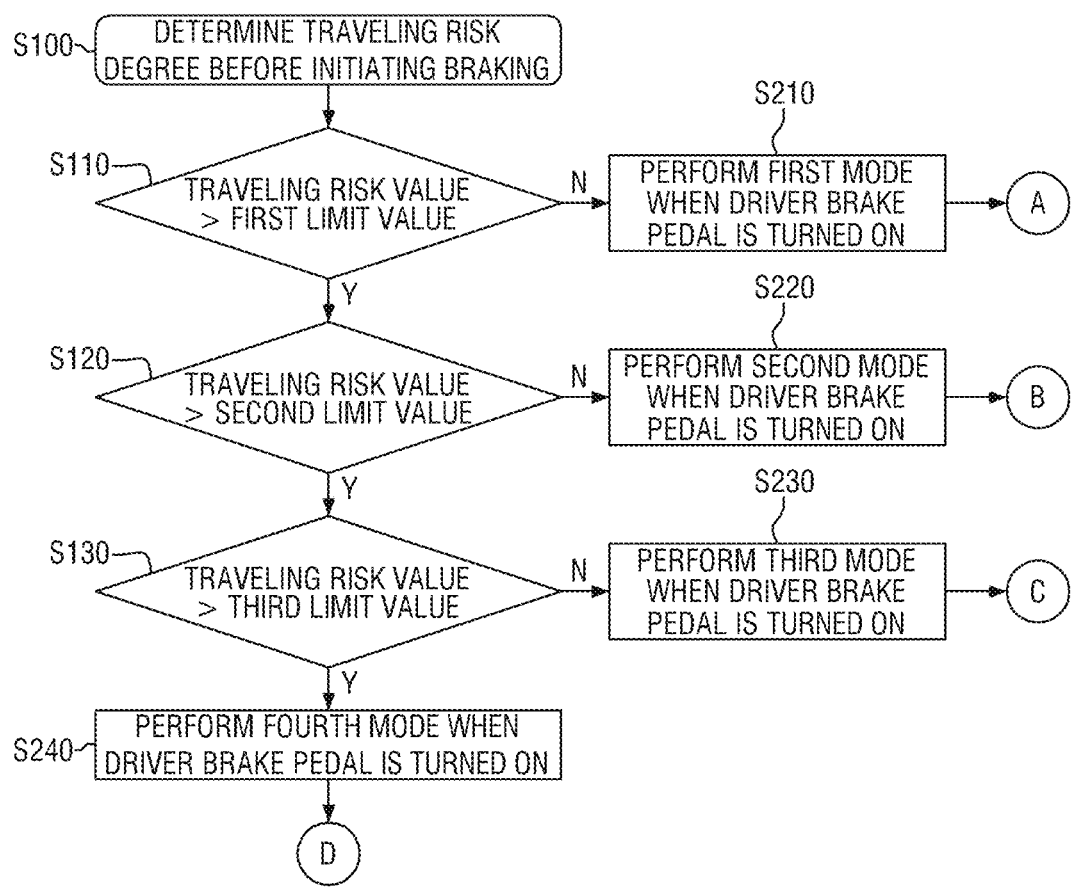
FIG. 6 is a flowchart illustrating a method of selecting the first to fourth modes based on a traveling state risk degree determined before initiating braking.

FIG. 6 is a flowchart illustrating the method of selecting the first to fourth modes based on the traveling state risk degree determined before initiating braking. FIG. 6 is a view for explaining the first step S100 and the second step S200.

Hereinafter, a method of performing the braking mode in the method of cooperatively controlling regenerative braking step by step for a rear-wheel-drive environmentally-friendly vehicle according to the exemplary embodiment of the present disclosure will be described with reference to FIG. 6.

First, in the first step S100, the traveling risk degree is determined before initiating braking. In the exemplary embodiment of the present disclosure, the braking controller performs the first step S100, and the braking controller calculates a traveling risk value by converting the traveling risk degree into a magnitude of deceleration that matches with the traveling risk degree. The braking controller compares the calculated traveling risk value with the first to third limit values.

First, the braking controller determines whether the traveling risk value is larger than the first limit value (S110). When the traveling risk value is smaller than the first limit value, the first mode is selected when performing braking (S210). On the contrary, when the traveling risk value is larger than the first limit value, the braking controller determines whether the traveling risk value is larger than the second limit value (S120).

When the traveling risk value is smaller than the second limit value, the second mode is selected (S220). On the contrary, when the traveling risk value is larger than the second limit value, the braking controller determines whether the traveling risk value is larger than the third limit value (S130).

When the traveling risk value is smaller than the third limit value, the third mode is selected (S230). On the contrary, when the traveling risk value is larger than the third limit value, the fourth mode is selected (S240).

The third step S300 is a step of re-determining the traveling risk degree of the vehicle in a situation after braking. The situation after braking may mean a case in which the driver pushes the brake pedal during the first step S100 and the second step S200. Here, because the method of determining the traveling risk degree is identical to the method in the first step S100, a description thereof will be omitted.

The fourth step S400 is a step of maintaining or changing the selectively (currently) performed braking mode based on the traveling risk degree determined in the third step S300.

Figure 7:
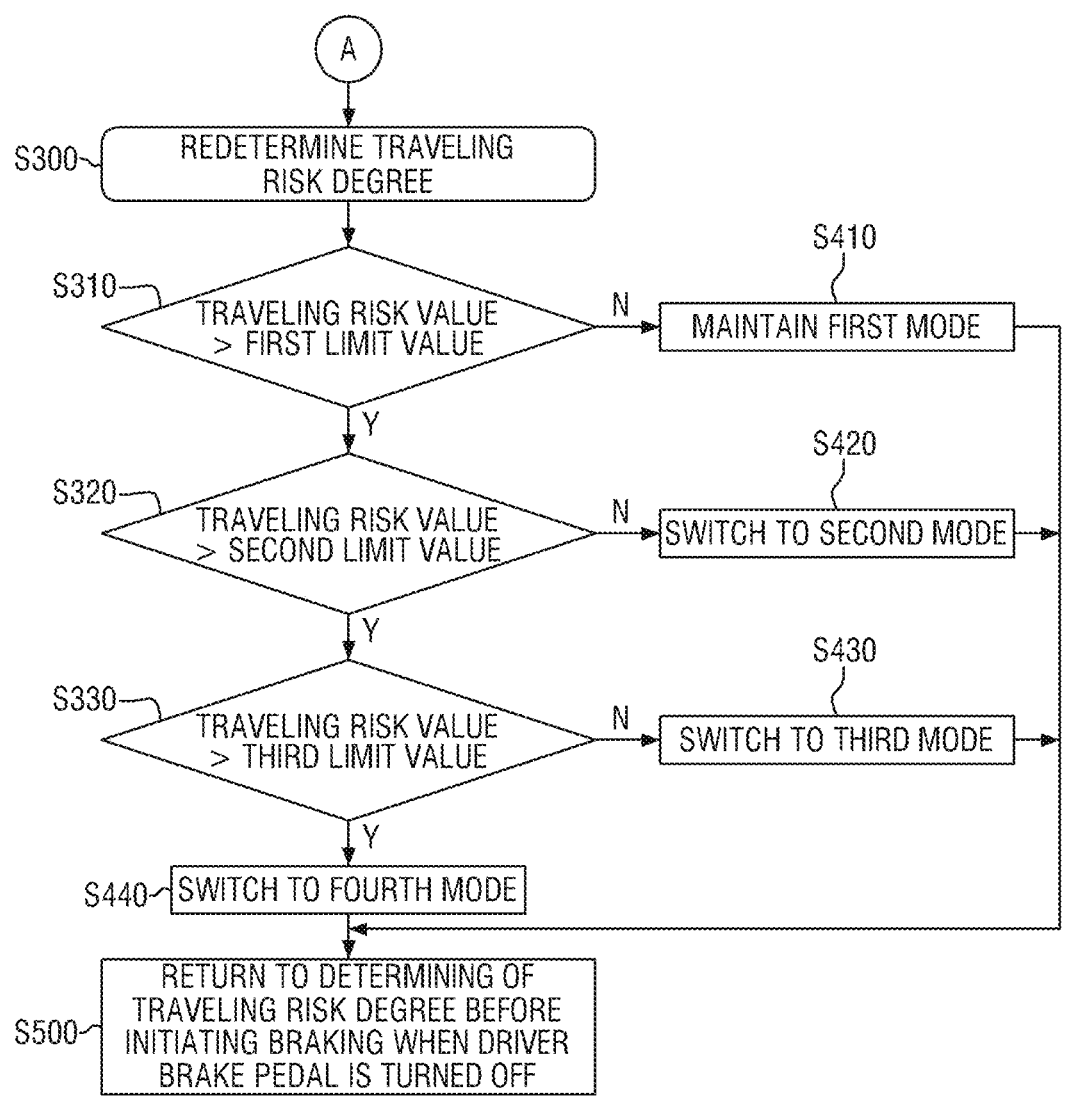
FIG. 7 is a flowchart illustrating a determination method for switching to another mode or maintaining the first mode after braking in the first mode.
Figure 8:
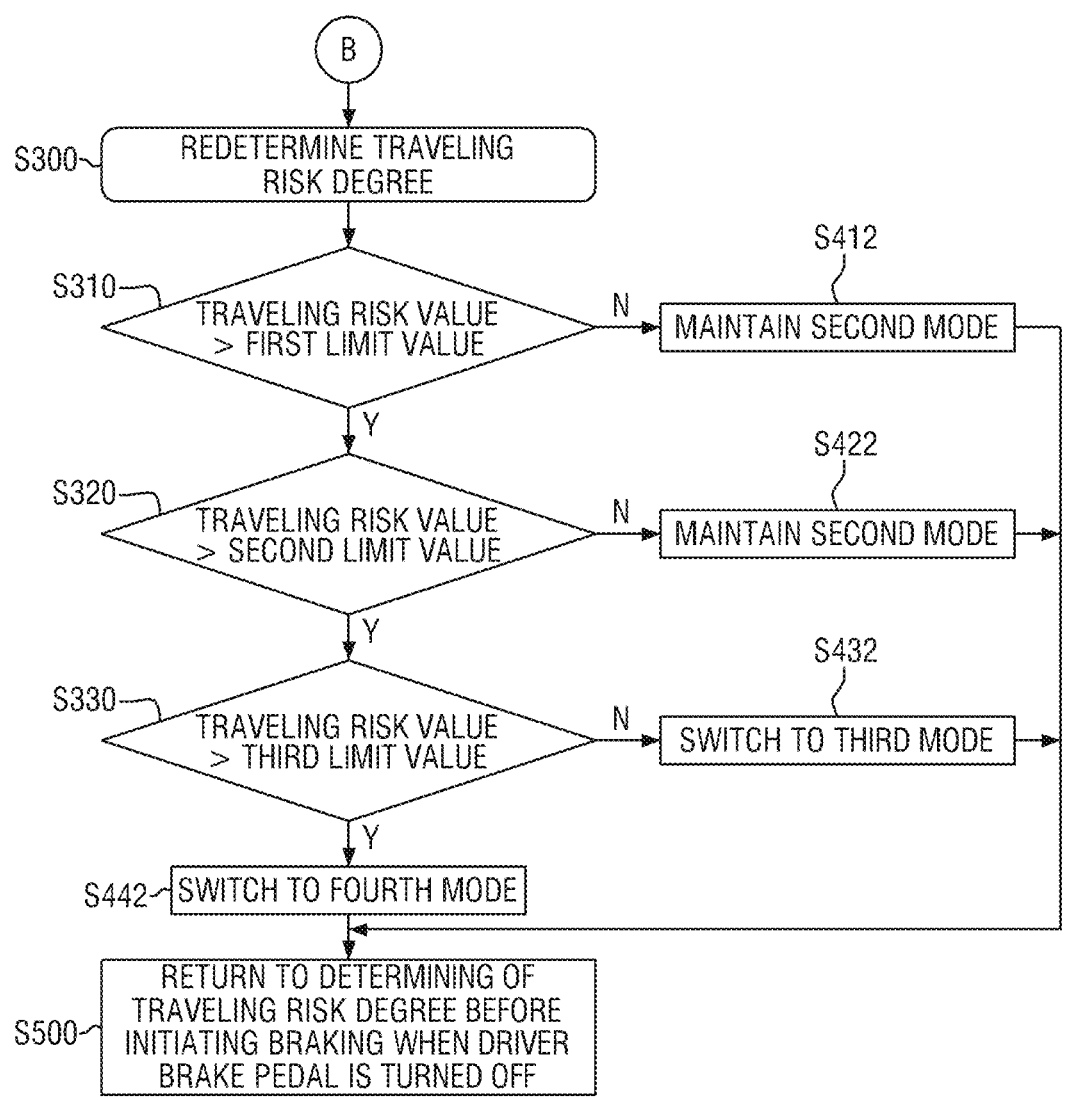
FIG. 8 is a flowchart illustrating a determination method for switching to another mode or maintaining the second mode after braking in the second mode.
Figure 9:
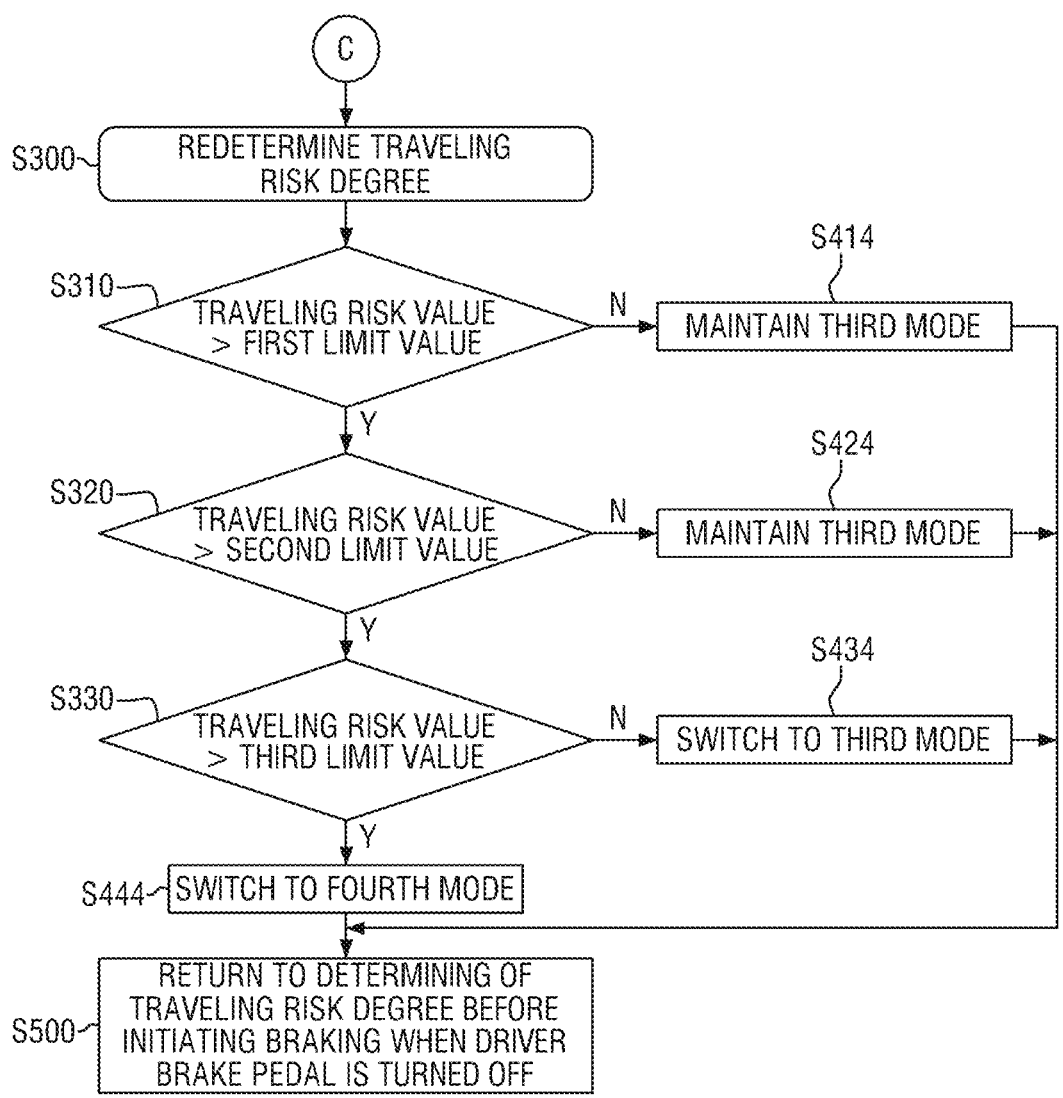
FIG. 9 is a flowchart illustrating a determination method for switching to another mode or maintaining the third mode after braking in the third mode.
Figure 10:
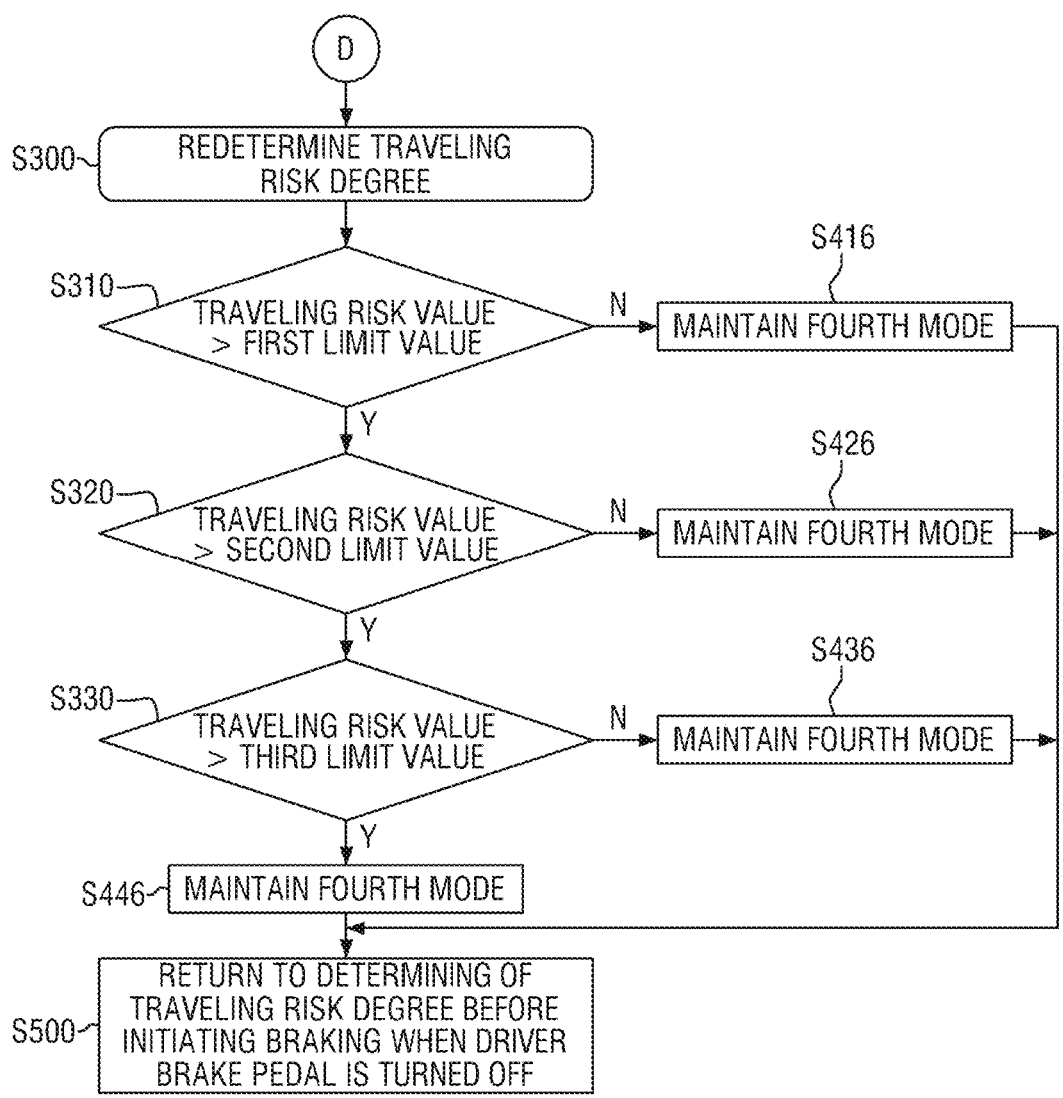
FIG. 10 is a flowchart illustrating a process of maintaining the fourth mode after braking in the fourth mode.
Figure 11A:
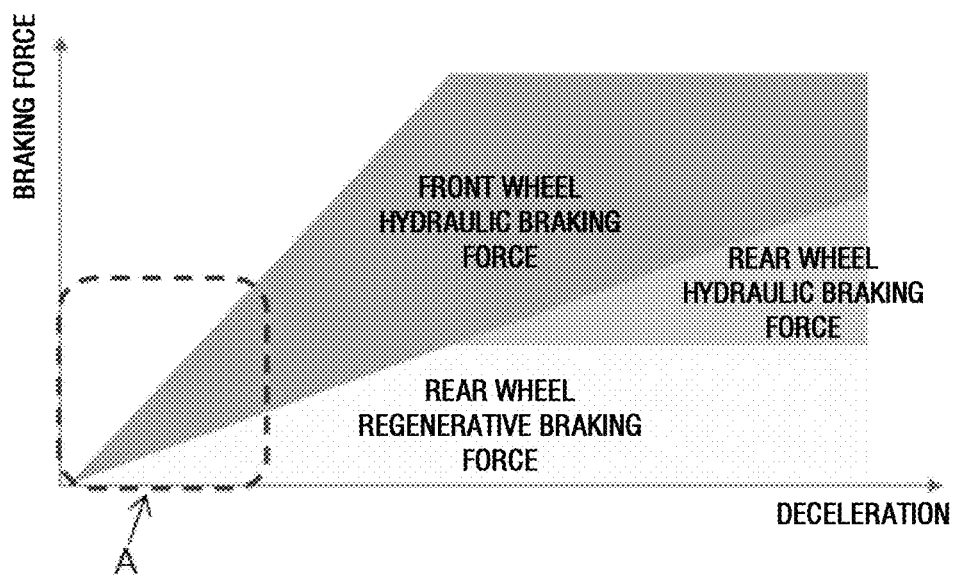
FIG. 11A (RELATED ART) is a braking diagram illustrating a technology in the related art that preferentially considers stability of a vehicle, and FIG. 11B (RELATED ART) is a braking diagram illustrating a technology in the related art that preferentially considers an improvement of fuel economy.
Figure 11B:
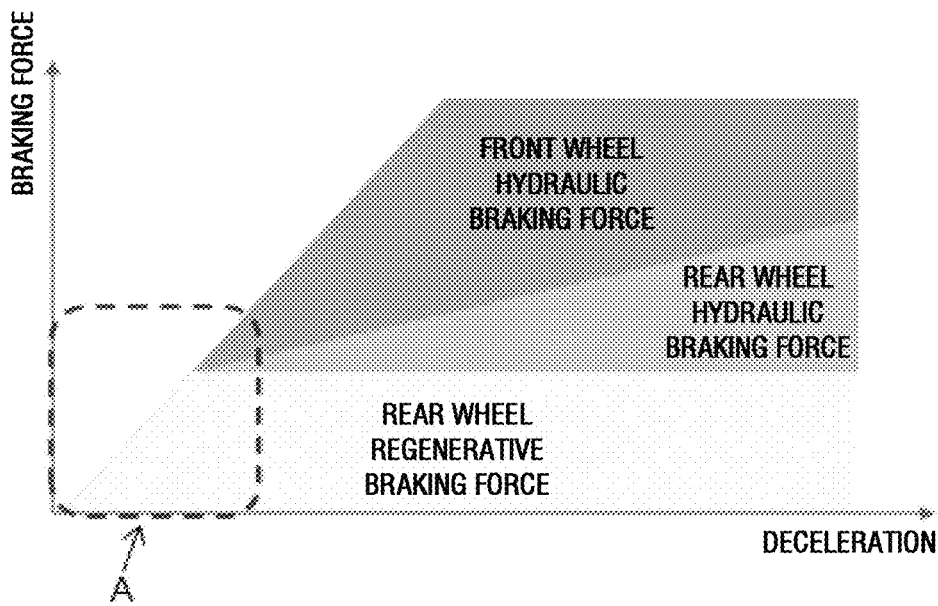

FIG. 7 is a flowchart illustrating a determination method for switching to another mode or maintaining the first mode after braking in the first mode, FIG. 8 is a flowchart illustrating a determination method for switching to another mode or maintaining the second mode after braking in the second mode, FIG. 9 is a flowchart illustrating a determination method for switching to another mode or maintaining the third mode after braking in the third mode, and FIG. 10 is a flowchart illustrating a process of maintaining the fourth mode after braking in the fourth mode.

As illustrated in FIGS. 7 to 10, the current braking mode is maintained or changed to another braking mode based on a comparison of magnitudes between the traveling risk value and the first to third limit values. However, the current braking mode is changed when the re-determined traveling risk value is larger than the limit value in the current braking mode, and the current braking mode is maintained when the re-determined traveling risk value is smaller than the limit value in the current braking mode. For example, referring to FIG. 7, in a case in which the current braking mode is the first mode (the limit value in the first mode is the first limit value), the first mode is maintained (S410) when the re-determined traveling risk value is smaller than the first limit value, and the first mode is changed to the second to fourth modes (S430, S440) based on the comparison with the second or third limit value when the re-determined traveling risk value is larger than the first limit value. The contents illustrated in FIGS. 8 to 10 may be sufficiently understood with reference to the above-mentioned principle.

Meanwhile, in the method of cooperatively controlling regenerative braking step by step for a rear-wheel-drive environmentally-friendly vehicle according to the exemplary embodiment of the present disclosure, the first to fourth steps S100, S200, S300 and S400 are processes performed while the driver pushes the brake pedal once. Therefore, a fifth step S500 is a step of returning the process back to the first step S100 when the driver releases the brake pedal.

The present disclosure has been described with reference to the limited exemplary embodiments and the drawings, but the present disclosure is not limited thereto. The described exemplary embodiments may be variously changed or modified by those skilled in the art to which the present disclosure pertains within the technical spirit of the present disclosure and within the scope equivalent to the appended claims.

What is claimed is:

1. A method of cooperatively controlling regenerative braking step by step for a vehicle, which distributes braking force to a front wheel and a rear wheel differently based on a traveling risk degree in consideration of regenerative coasting braking force and rear wheel regenerative braking force generated to the rear wheel, the method comprising:
    a first step of determining in advance, by a braking controller, the traveling risk degree before initiating braking;
    a second step of selectively performing, by the braking controller, any one of braking modes defined based on the traveling risk degree during braking;
    a third step of re-determining, by the braking controller, the traveling risk degree after the second step; and
    a fourth step of changing, by the braking controller, the selectively performed braking mode based on the traveling risk degree determined in the third step,
    wherein the braking modes include a first mode which has a section of deceleration having a first limit value and in which the vehicle is determined as being in a stable state, and the first mode performs braking such that only the rear wheel regenerative braking force is generated and increased until the maximum rear wheel regenerative braking force is generated,
    wherein the first mode distributes the braking force to the front wheel and the rear wheel while constantly maintaining maximum rear wheel regenerative braking force from a magnitude of deceleration at which the maximum rear wheel regenerative braking force is generated to the first limit value,
    wherein the braking modes include a second mode which has a section of deceleration having a second limit value and is determined as a state in which a traveling risk value calculated based on the traveling risk degree is larger than the first limit value and smaller than the second limit value, and the second mode considers the rear wheel regenerative braking force and distributes the braking force to the front wheel and the rear wheel at a rear-wheel-first-locking preventing distribution ratio at which no over braking occurs on the rear wheel, and
    wherein the braking modes include a third mode which has a section of deceleration having a third limit value and is determined as a state in which the traveling risk value calculated based on the traveling risk degree is larger than the second limit value and smaller than the third limit value, and the third mode releases the rear wheel regenerative braking and distributes the braking force to the front wheel and the rear wheel at the rear-wheel-first-locking preventing distribution ratio.

2. The method of claim 1, wherein the traveling risk degree is determined based on any one or more of pieces of information among information about a traveling state of the vehicle, information about a condition in which a driver accelerates the vehicle, information about a state of a road surface, and information about an amount of regenerative braking enabled by a driver controller.

3. The method of claim 1, wherein the braking modes include a fourth mode in which the traveling risk value calculated based on the traveling risk degree is larger than the third limit value, and the fourth mode releases both of the rear wheel regenerative braking force and the regenerative coasting braking force and distributes the braking force to the front wheel and the rear wheel at the rear-wheel-first-locking preventing distribution ratio.

4. The method of claim 1, wherein the rear-wheel-first-locking preventing distribution ratio is a front/rear wheel basic distribution ratio determined based on brake specifications.

5. The method of claim 1, wherein the first mode is changed to the second mode in the fourth step when it is determined in the third step that the traveling risk value is larger than the first limit value and smaller than the second limit value while performing braking in the first mode.

6. The method of claim 5, wherein when switching to the second mode, the rear wheel regenerative braking force is decreased from the maximum rear wheel regenerative braking force down to a force that satisfies the rear-wheel-first-locking preventing distribution ratio.

7. The method of claim 1, wherein the second mode is changed to the third mode in the fourth step when it is determined in the third step that the traveling risk value is larger than the second limit value and smaller than the third limit value while performing braking in the second mode.

8. The method of claim 3, wherein the third mode is changed to the fourth mode in the fourth step when it is determined in the third step that the traveling risk value is larger than the third limit value while performing braking in the third mode.

9. A non-transitory computer readable medium containing program instructions executed by a processor, the computer readable medium comprising:
program instructions that determine in advance a traveling risk degree before initiating braking;
program instructions that selectively perform any one of braking modes defined based on the traveling risk degree during braking;
program instructions that re-determine the traveling risk degree after selectively performing the one of the braking modes; and
program instructions that change the selectively performed braking mode based on the re-determined traveling risk degree,
wherein the braking modes include a first mode which has a section of deceleration having a first limit value and in which the vehicle is determined as being in a stable state, and the first mode performs braking such that only the rear wheel regenerative braking force is generated and increased until the maximum rear wheel regenerative braking force is generated,
wherein the first mode distributes the braking force to the front wheel and the rear wheel while constantly maintaining maximum rear wheel regenerative braking force from a magnitude of deceleration at which the maximum rear wheel regenerative braking force is generated to the first limit value,
wherein the braking modes include a second mode which has a section of deceleration having a second limit value and is determined as a state in which a traveling risk value calculated based on the traveling risk degree is larger than the first limit value and smaller than the second limit value, and the second mode considers the rear wheel regenerative braking force and distributes the braking force to the front wheel and the rear wheel at a rear-wheel-first-locking preventing distribution ratio at which no over braking occurs on the rear wheel, and
wherein the braking modes include a third mode which has a section of deceleration having a third limit value and is determined as a state in which the traveling risk value calculated based on the traveling risk degree is larger than the second limit value and smaller than the third limit value, and the third mode releases the rear wheel regenerative braking and distributes the braking force to the front wheel and the rear wheel at the rear-wheel-first-locking preventing distribution ratio.

* * * * *